United States Patent [19]
Smith

[11] Patent Number: 5,752,012
[45] Date of Patent: May 12, 1998

[54] COMPUTATIONAL ARRAY WITH SELF TIMED COMPUTATIONAL ELEMENT AND METHOD OF SELF TIMED CALCULATION

[75] Inventor: Stephen Lee Smith, Chandler, Ariz.

[73] Assignee: Motorola, Schaumburg, Ill.

[21] Appl. No.: 610,775

[22] Filed: Mar. 4, 1996

[51] Int. Cl.[6] ........................................ G06F 1/04
[52] U.S. Cl. ........................................... 395/559
[58] Field of Search ............................. 395/553, 555, 395/556, 559, 200.13, 200.15, 200.19, 800.1, 800.22

[56] References Cited

U.S. PATENT DOCUMENTS

| | | | |
|---|---|---|---|
| 4,344,134 | 8/1982 | Barnes | 395/800.16 |
| 4,546,445 | 10/1985 | Haugen | 364/750.5 |
| 5,450,557 | 9/1995 | Kepp et al. | 395/800.24 |
| 5,487,153 | 1/1996 | Hammerstrom et al. | 395/670 |

OTHER PUBLICATIONS

"A Fully Asynchronous Digital Signal Processor Using Self-Timed Circuits", Gordon M. Jacobs and Robert W. Brodersen, IEEE Journal of Solid-State Circuits, vol. 25, No. 6, Dec. 1990, pp. 1526–1537.

Primary Examiner—Thomas M. Heckler
Attorney, Agent, or Firm—S. Kevin Pickens

[57] ABSTRACT

A computational array includes a self timed computational element that performs self timed calculations internally independent of a global clock. The self timed computational element includes a computational unit (100) which produces a complete signal upon the completion of calculation of a result value. The self timed computational element also includes a self timed control unit (200) which determines whether a new result value is to be calculated by the computational unit (100) based on an iteration signal which indicates a number of times the new result value is to be calculated, and based on the complete signal received from the computational unit (100) indicating that each previous calculation has been completed. Upon determining that a new result value is to be calculated, the self timed control unit (200) provides a self timed clock signal to the computational unit (100) and the computational unit (100) calculates the new result value accordingly.

24 Claims, 3 Drawing Sheets

COMPUTATIONAL ARRAY WITH SELF TIMED COMPUTATIONAL ELEMENT AND METHOD OF SELF TIMED CALCULATION

TECHNICAL FIELD

This invention relates generally to computer circuits and, more particularly, to computational arrays.

BACKGROUND OF THE INVENTION

A computational array of computational elements typically performs computations under the control of an external circuit such as a host computer. The computational elements are driven by a same global clock such as the system clock of the host computer. A given computational element may perform a computation requiring multiple calculations before producing a result. However, it is desirable to complete the computations of all of the computational elements in the computational array within a single clock cycle of the global clock. Typically, this is not possible because each of the computations performed by each computational element are synchronized to the global clock. As a result, a computational element performing a computation requiring n calculations would use n clock cycles to complete the computation. Thus, it is desirable to provide a computational array with computational elements which perform computations more efficiently.

DESCRIPTION OF THE PREFERRED EMBODIMENT

Figure 1:
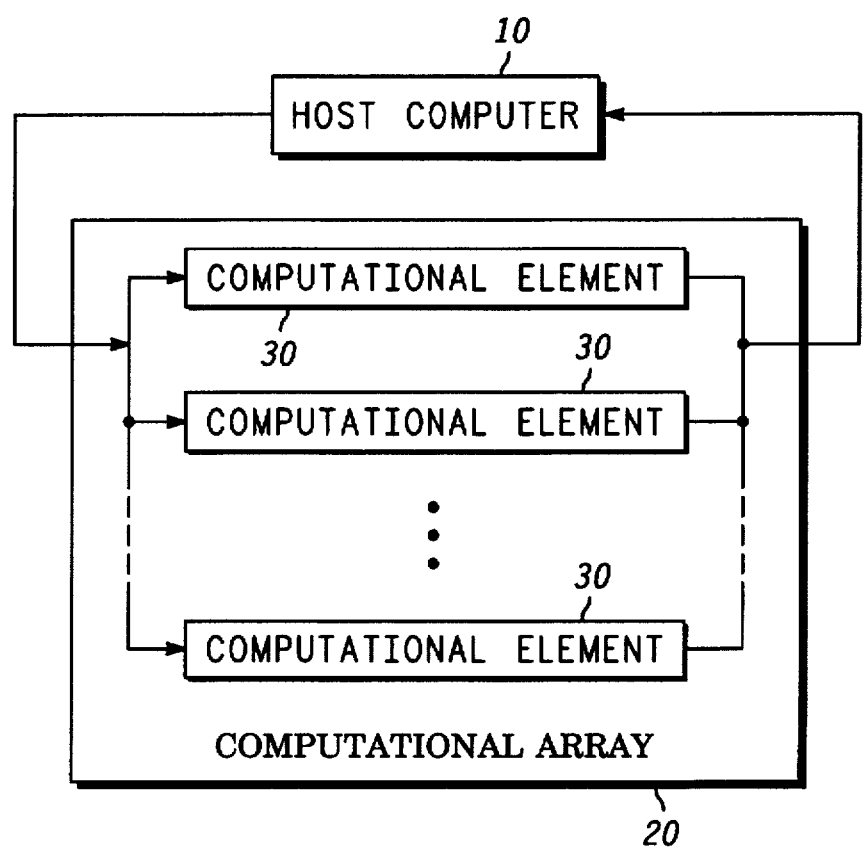
FIG. 1 is a block diagram of a computational array of computational elements provided in accordance with the preferred embodiment the invention.

In a preferred embodiment of the invention, a computational array is provided with at least one self timed computational element that performs self timed calculation in a fashion that is internally independent of a global clock. The self timed computational element includes a computational unit. The computational unit calculates a result value based on an input value. The computational unit produces a completion signal upon completion of calculating the result value. The self timed computational element also includes a self timed control unit. The self timed control unit determines when a new result value is to be calculated based on the completion signal produced by the computational unit. The self timed control unit produces a self timed clock signal which has a first self timed clock signal logic state (e.g., logic HIGH) when the new result value is to be calculated. The self timed clock signal has a second self timed clock signal logic state that differs from the first self timed clock signal logic state (e.g., logic LOW) when the new result value is not to be calculated. The computational unit calculates the new result value upon receiving the self timed clock signal having the first self timed clock signal logic state from the self timed control unit.

In the preferred embodiment, the computational unit calculates the new result value based on the input value and based on the result value previously calculated. The self timed control unit receives an iteration signal. The self timed control unit determines whether the new result value is to be calculated a number of times based on the iteration signal. The self timed control unit provides the self timed clock signal having the first self timed clock signal logic state to the computational unit each time the self timed control unit determines that the new result value is to be calculated. The computational unit calculates the new result value each time the self timed clock signal having the first self timed clock signal logic state is received from the self timed control unit, thus calculating the new result value a number of times based on the iteration signal.

In a particularly useful application of the preferred embodiment, the computational array calculates a polynomial, computing each term in one of the computational elements within the computational array. In this case, the computational unit initially receives a weight signal representing a weight value and multiplies the input value by the weight value to weight the input value accordingly. Thereafter, the computational unit multiplies the input value by the result value previously calculated a number of times indicated by an exponent signal to exponentiate the input value. The self timed control unit includes an exponent counter circuit which determines the number of times the computational unit multiplies the input value by the result value. The exponent counter circuit receives the exponent signal as the iteration signal discussed above, indicating a power to which the input value is to be raised. The self timed control unit provides the self timed clock signal with the first self timed clock signal logic state to the computational unit a number of times based on the power indicated by the exponent signal. The control unit calculates the new result value by multiplying the input value by the result value each time the self timed clock signal with the first self timed clock signal logic state is received from the self timed control unit. In this way, the new result value is calculated each of the number of times based on the power indicated by the exponent signal.

More specifically, the exponent circuit initially sets a count value to the power indicated by the exponent value. Upon first receiving the exponent signal and then each time the self timed clock signal is received, the exponent counter circuit decrements the count value and produces a nonzero count signal. The nonzero count signal has a first nonzero count signal logic state (e.g., logic HIGH) when the count value remains above zero. The nonzero count signal has a second nonzero count signal logic state when the count value no longer remains above zero. If the nonzero count signal has the first nonzero count signal logic state, the self timed control unit provides the self timed clock signal with the first self timed clock signal logic state to the computational unit. The computational unit multiplies the input value by the result value each time the self timed clock signal having the first self timed clock signal logic state is received from the self timed control unit. When the count value has been decremented to zero, the exponent counter circuit produces the nonzero count signal with the second nonzero count signal logic state. This prepares the computational unit to obtain a new input value and perform a new computation based on the new input value during a next global clock cycle.

By providing the self timed clock signal and maintaining the self timed clock signal independently of the global clock, the self timed computational element of the preferred embodiment is not limited in calculation time of each of the iterations of the calculations to the speed of the global clock. As a result, multiple iterations can be performed within a global clock cycle of the global clock. Although such multiple iterations could be accomplished by providing each computational element in the computational array with a conventional high speed clock having a faster clock speed than the global clock, such a provision requires a distribution of the high speed clock to all computational elements in the computational array. This results in wasted power, particularly when not all computational elements are involved in the overall calculation. Further, the distribution of a conventional high speed clock to all of the computational elements introduces synchronization problems, clock skew and interconnect delays. The preferred embodiment of the present invention thus provides the advantage of having computational elements that can perform computations without using as many global clock cycles, while providing the further advantage of avoiding the burdens of synchronization problems, wasted power, clock skew, and interconnect delays. The preferred embodiment of the present invention thus provides the advantages of multiple iterations per global clock cycle without requiring the disadvantages of utilizing a conventional high speed clock.

FIG. 1 is a block diagram of a computational array of computational elements provided in accordance with the preferred embodiment. In FIG. 1, a host computer 10 is connected to a computational array 20. The host computer 10 is, for example, any conventional computer which runs software that provides inputs to the computational array 20 and obtains outputs from the computational array 20 to calculate the terms of a polynomial. In the preferred embodiment, the computational array 20 is implemented in digital circuitry such as an integrated circuit. One of ordinary skill in the art will recognize that the computational array 20 can be implemented in a variety of ways in accordance with the invention described herein.

The host computer 10 utilizes the computational array 20 to perform applications requiring parallel computations. The computational array 20 includes a number of computational elements 30 which perform computations in parallel. In a preferred embodiment, the computational array 20 calculates polynomials, computing each term in one of the computational elements 30. The host computer 10 or a sum circuit (not shown) sums the results from each computational element to produce a polynomial solution. However, one of ordinary skill in the art will recognize that the concept of the self timed computational element disclosed herein may be applied in a computational array 20 which performs any of a variety of useful calculations. The computational elements 30 receive various inputs from the host computer 10 through the computational array 20, perform the appropriate computations and provide outputs to the host computer 10 based on the results of those computations. An example of a computational array 20 which calculates a polynomial is described in (MNE00315N), entitled "COMPUTATIONAL ARRAY CIRCUIT FOR PROVIDING PARALLEL MULTIPLICATION," filed Mar. 3, 1995, which is hereby incorporated by reference. Another example of a computational array 20 is provided in (MNE00361N), entitled "COMPUTATIONAL ARRAY AND METHOD FOR CALCULATING MULTIPLE TERMS OF A POLYNOMIAL IN A SINGLE COMPUTING ELEMENT," filed Dec. 28, 1995, which is also hereby incorporated by reference. Additionally, a description of an existing computational element can be found in U.S. Pat. No. 5,390,136, entitled "ARTIFICIAL NEURON AND METHOD OF USING SAME", issued Feb. 14, 1995, which is also hereby incorporated by reference.

Figure 2:
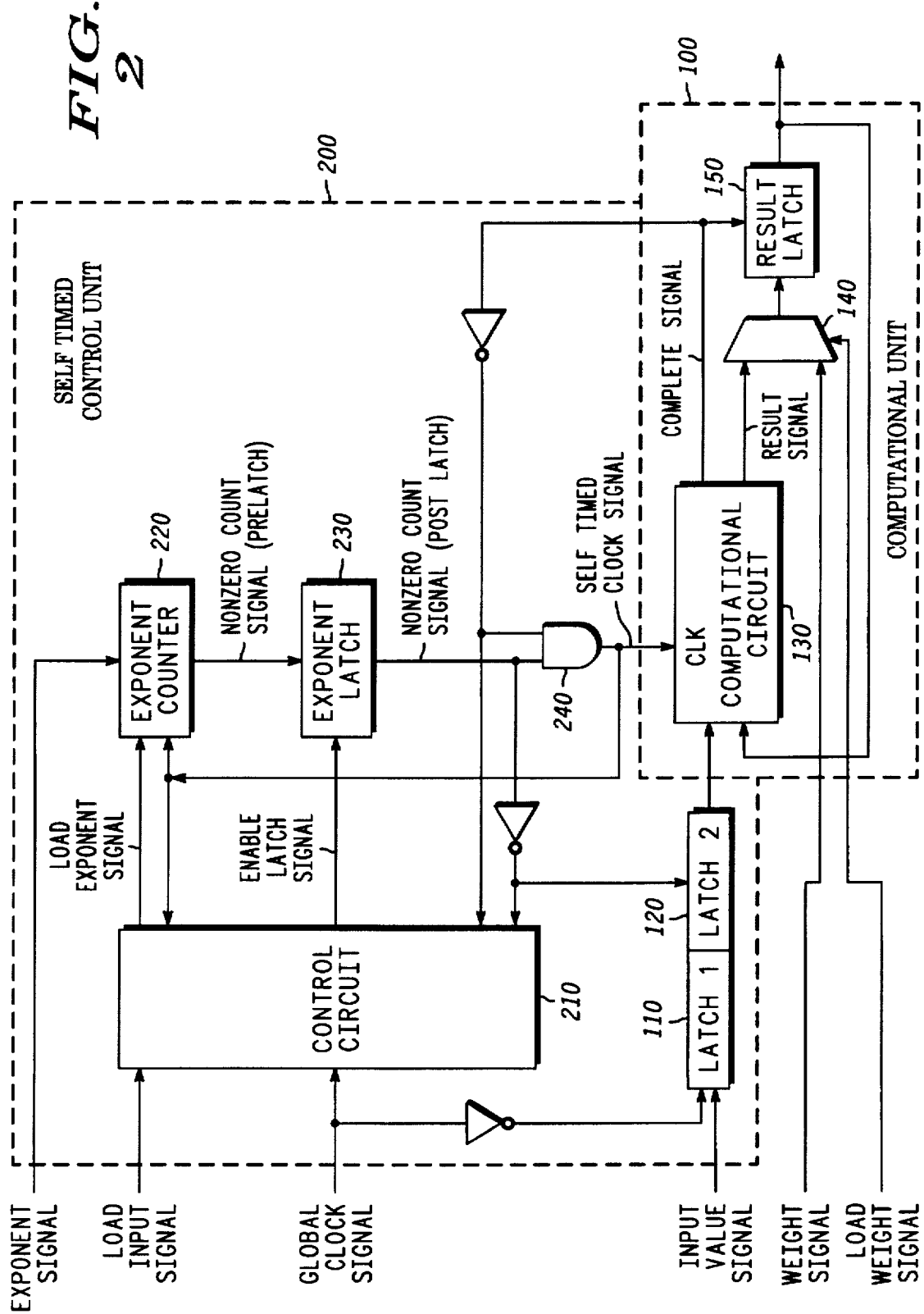
FIG. 2 is a block circuit diagram of a self timed computational element provided in accordance with the preferred embodiment.

FIG. 2 is a block circuit diagram of a self timed computational element in accordance with the preferred embodiment. The self timed computational element of FIG. 2 is a computational element 30 of FIG. 1 which includes self timed circuitry. The self timed computational element provides a self timed clock signal and performs self timed calculations internally independent of a global clock which is, for example, the system clock of the host computer 10. The self timed computational element includes a computational unit 100 which produces a complete signal upon the completion of calculation of a result value. The self timed computational element also includes a self timed control unit 200 which determines whether a new result value is to be calculated by the computational unit 100 based on an iteration signal which indicates a number of times that the new result value is to be calculated, and based on the complete signal received from the computational unit 100 indicating that each previous calculation has been completed. Upon determining that a new result value is to be calculated, the self timed control unit 200 provides a self timed clock signal to the computational unit 100 and the computational unit 100 calculates the new result value accordingly.

Specifically, the computational unit 100 contains a latch1 110 and a latch2 120. The latch1 110 receives the input value signal provided by the host computer 10 when the global clock signal is LOW. The input value signal represents an input value to be computed by the computational unit 100, as will be explained below. The input value is transferred from latch1 110 to latch2 120 when a nonzero count signal, which will be explained in more detail below, is LOW, indicating a new input value is to be computed by a computational circuit 130. The computational circuit 130 includes for example, a multiplier. Alternatively, the computational circuit 130 includes an adder, and the computational array 20 is provided in a logarithmic environment such as that described in (MNE00315N), entitled "COMPUTATIONAL ARRAY CIRCUIT FOR PROVIDING PARALLEL MULTIPLICATION," filed Mar. 3, 1995.

The computational circuit 130 receives the input value signal and a multiplier value signal representing a multiplier value to be multiplied by the input value. Initially in a computation, a load weight signal received from the host computer 10 is HIGH and applied to the multiplexer 140 to select a weight signal, also received from the host computer 10, which represents a weight value. Thus, the multiplier value signal represents the weight value which is to be applied to the polynomial term. In any iterations of the computation thereafter, the load weight signal is LOW. The multiplexer 140 selects the result value signal, which represents the previously calculated result value, as the multiplier signal. Thus, the previously calculated result value is multiplied by the input value to produce a new result value. Upon completion of each calculation that multiplies the input value by the appropriate multiplier value, the computational circuit 130 produces a complete signal. The complete signal is provided to result latch 150, which provides the finally calculated result value upon completion of calculation of the term. Finally, the complete signal is provided to the self timed control unit 200.

The self timed control unit 200 includes a control circuit 210. The control circuit 210 receives the global clock signal and a load input signal from the host computer 10. When the load input signal is HIGH the control circuit 210 provides a HIGH load exponent signal to the exponent counter circuit 220. This allows the exponent counter circuit 220 to receive the exponent signal, which represents a power to which the input value is to be exponentiated. The exponent counter circuit 220 sets a count value to the power. The count value will be decremented each time the input value is multiplied by the multiplier value represented by the multiplier value signal. The exponent counter circuit 220 sets a nonzero count signal to HIGH when the count value is greater than zero and sets the nonzero count signal to LOW when the count value is not greater than zero.

When the global clock signal goes HIGH (when, for example, the system clock in the host computer 10 goes HIGH) a calculation is initiated in the self timed computational element. Specifically, the control circuit 210 provides a HIGH enable latch signal to the exponent latch 230, which holds the nonzero count signal. This allows the exponent latch 230 to provide an inverted nonzero count signal to the control circuit 210, which sets the load exponent signal and the enable latch signal to LOW as a result. The exponent latch 230 also provides the nonzero count signal to AND gate 240, which ANDs the nonzero count signal with an inverted complete signal. The AND gate 240 thus produces the self timed clock signal.

The AND gate 240 provides the self timed clock signal to the computational unit 100 and to the exponent counter circuit 220. While the count value remains above zero, indicating that exponentiation of the input value is not yet complete, the nonzero count signal input to the AND gate 240 is HIGH. The inverse of the initially LOW complete signal is initially HIGH, thus producing a HIGH self timed clock signal. The HIGH self timed clock signal enables calculation by the computational unit 100. The HIGH self timed clock signal also causes the exponent counter circuit 220 to decrement the count value. When calculation by the computational unit 100 is complete, the computational circuit 130 sets the complete signal to HIGH. This renders the inverted complete signal LOW and thus changes the self timed clock signal to LOW via the AND gate 240.

Figure 3:
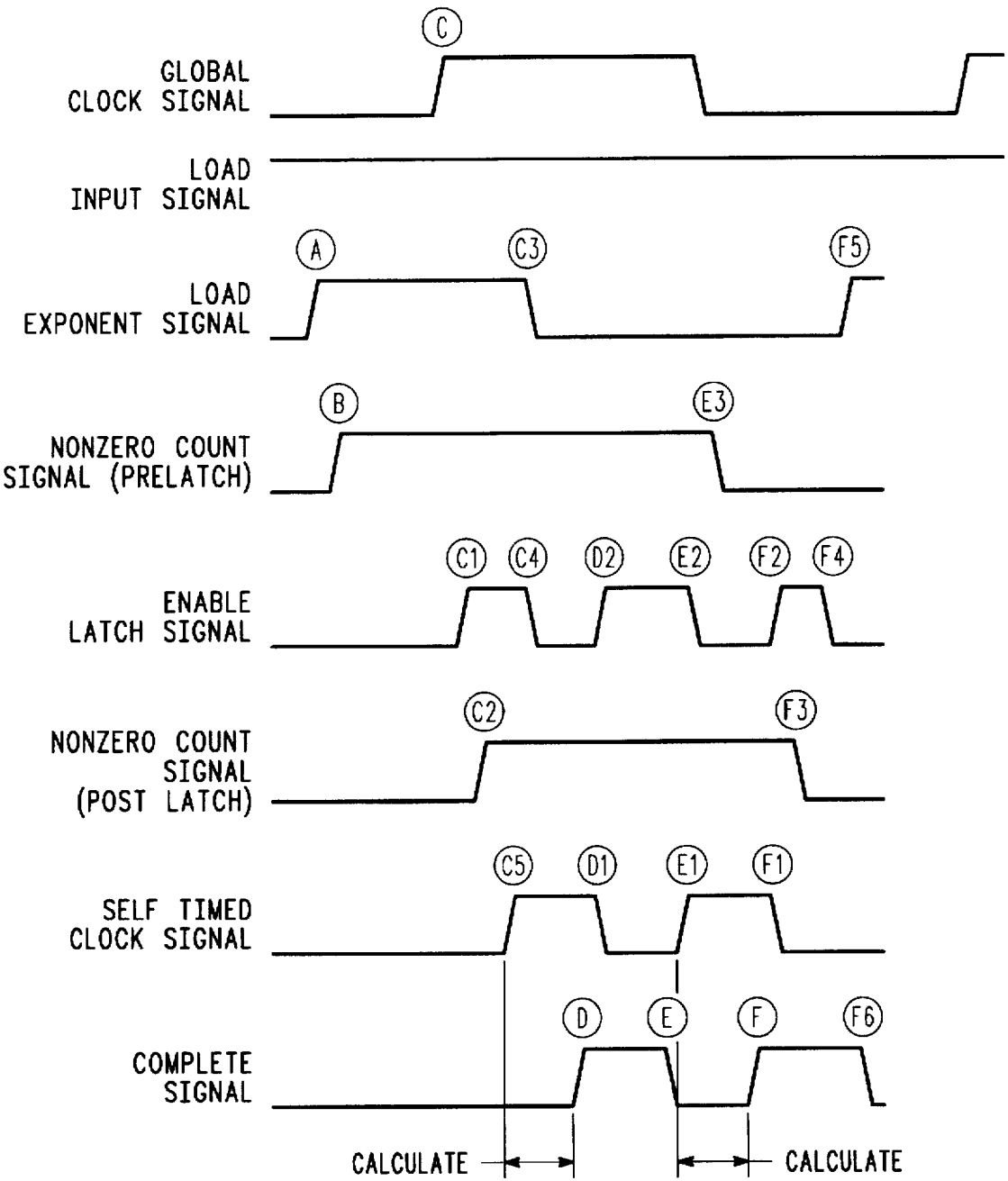
FIG. 3 is a waveform chart of the signals within the self timed computational element of FIG. 2.

The flow and operation of the self timed computational element will now be more specifically described with reference to FIG. 3. FIG. 3 is a waveform chart of the various signals, discussed above, within the self timed computational element of FIG. 2. FIG. 3 show the global clock signal, the load input signal, the load exponent signal, the nonzero count signal (prelatch), the enable latch signal, the nonzero count signal (postlatch), the self timed clock signal and the complete signal. As an example, let it be assumed that the input value has been loaded into latch2 120 and the power to which the input value is to be exponentiated is 2. Let it further be assumed that the weight value has been loaded into the result latch 150 and the load input signal is now HIGH.

In response to the HIGH load input signal, the control circuit 210 sets the load exponent signal to HIGH at point A. The power indicated by the exponent signal is thus loaded into the count value by the exponent counter circuit 220. The exponent counter circuit 220 thus sets the nonzero count signal to HIGH at point B. When the global clock signal is set to HIGH by the host computer 10 at point C, the control circuit 210 sets the enable latch signal to HIGH at point C1. The HIGH prelatch nonzero count signal is passed through the exponent latch 230 and the postlatch nonzero count signal becomes HIGH at point C2. The control circuit 210 sets the load exponent signal to LOW at point C3 and the enable latch signal to LOW at point C4 in response to the LOW inverted nonzero count signal. The nonzero count signal and inverted complete signal are ANDed by the AND gate 240 to produce a HIGH self timed clock signal at point C5. The self timed clock signal causes the computational circuit 130 to begin calculation and causes the exponent counter circuit 220 to decrement the count value to 1.

When the computational circuit 130 completes calculation, the computational circuit 130 produces a HIGH complete signal at point D. The HIGH complete signal produces a LOW inverted complete signal. The LOW inverted complete signal causes the AND gate 240 to produce a LOW self timed clock signal at point D1. The LOW inverted complete signal also causes the control circuit 210 to produce a HIGH enable latch signal at point D2.

When the computational circuit 130 has precharged then the computational circuit 130 produces a LOW complete signal at point E. The resulting HIGH inverted complete signal causes the AND gate 240 to produce a HIGH self timed clock signal at point E1. The HIGH inverted complete signal also causes the control circuit 210 to produce a LOW enable latch signal at point E2. The HIGH self timed clock signal causes the exponent counter circuit 220 to decrement the count value to 0 and set the nonzero count signal to LOW, accordingly, at point E3.

When the computational circuit 130 completes the next calculation, the computational circuit 130 produces a HIGH complete signal at point F. The HIGH complete signal produces a LOW inverted complete signal. The LOW inverted complete signal also causes the control circuit 210 to produce a HIGH enable latch signal at point F2. As a result, the LOW prelatch nonzero count signal is passed through the exponent latch to produce a LOW postlatch nonzero count signal at point F3. The LOW nonzero count signal produces a HIGH inverted nonzero count signal, which causes the computational circuit 130 to set the enable latch signal to LOW at point F4 and, assuming the load input signal is still HIGH, indicating additional input values to be calculated, causes the computational circuit 130 to set the load exponent signal to HIGH at point F5 to load a new exponent signal into the exponent counter circuit 220. The HIGH inverted nonzero count signal also causes latch2 120 to load a new input value and provide an input value signal representing the new input value to the computational circuit 130. When the computational circuit 130 has precharged, the computational circuit 130 produces a LOW complete signal at point F6 and the self timed computational element is ready to perform a new computation.

The computational array circuit described above provides the advantages of having computational elements that can perform computations at a higher rate than the global clock, while providing the further advantage of avoiding the burdens of synchronization problems, wasted power, clock skew, and interconnect delays. While specific embodiments of the invention have been shown and described, further modifications and improvements will occur to those skilled in the art. It is understood that this invention is not limited to the particular forms shown and it is intended for the appended claims to cover all modifications of the invention which fall within the true spirit and scope of the invention.

What is claimed is:

1. A computational array having computational elements including at least one self timed computational element comprising:

a computational unit calculating a result value based on an input value and producing a completion signal upon completion of calculating the result value;

a self timed control unit, coupled to the computational unit and receiving the completion signal from the computational unit, the self timed control unit determining whether a new result value is to be calculated based on the completion signal and producing a self timed clock signal, the self timed clock signal having a first self timed clock signal logic state when the new result value is to be calculated and a second self timed clock signal logic state when the new result value is not to be calculated; and the computational unit calculating the new result value upon receiving the self timed clock signal having the first self timed clock signal logic state from the self timed control unit.

2. The computational array of claim 1 wherein the computational unit calculates the new result value based on the input value and based on the result value previously calculated.

3. The computational array of claim 2 wherein:

the self timed control unit receives an iteration signal and determines whether the new result value is to be calculated a number of times based on the iteration signal, providing the self timed clock signal having the first self timed clock signal logic state to the computational unit each time the self timed control unit determines that the new result value is to be calculated; and the computational unit calculates the new result value each time the self timed clock signal having the first self timed clock signal logic state is received from the self timed control unit, thus calculating the new result value a number of times based on the iteration signal.

4. The computational array of claim 3 wherein:

the self timed control unit comprises an exponent counter circuit, receiving the iteration signal as an exponent signal indicating a power to which the input value is to be raised, the self timed control unit providing the self timed clock signal having the first self timed clock signal logic state to the computational unit a number of times based on the power indicated by the exponent signal; and the self timed control unit calculates the new result value by multiplying the input value by the result value each time the self timed clock signal having the first self timed clock signal logic state is received from the self timed control unit, thus calculating the new result value.

5. The computational array of claim 4 wherein the computational unit receives a weight signal representing a weight value and wherein the computational unit initially multiplies the input value by the weight value instead of the result value.

6. The computational array of claim 5 wherein:

the exponent counter circuit decrements a count value, initially set to the power indicated by the exponent signal, each time the input value is to be multiplied by the result value, and produces a nonzero count signal each time the count value is decremented, the nonzero count signal having a first nonzero count signal logic state when the count value remains above zero and a second nonzero count signal logic state when the count value no longer remains above zero;

the self timed control unit provides the self timed clock signal having the first self timed clock signal logic state to the computational unit if the nonzero count signal has the first nonzero count signal logic state but not the second nonzero count signal logic state; and the computational unit multiplies the input value by the result value each time the self timed clock signal having the first self timed clock signal logic state is received from the self timed control unit.

7. The computational array of claim 6 wherein the computational unit obtains a new input value when the exponent counter circuit produces the nonzero count signal having the second nonzero count signal logic state, indicating that the count value has been decremented to zero, and wherein the computational unit performs a new computation based on the new input value upon receiving the nonzero count signal from the exponent counter circuit.

8. The computational array of claim 4 wherein:

the exponent counter circuit decrements a count value, initially set to the power indicated by the exponent signal, each time the input value is to be multiplied by the result value, and wherein the exponent counter circuit produces a nonzero count signal each time the count value is decremented, the nonzero count signal having a first nonzero count signal logic state when the count value remains above zero and a second nonzero count signal logic state when the count value no longer remains above zero;

the self timed control unit provides the self timed clock signal having the first self timed clock signal logic state to the computational unit if the nonzero count signal has the first nonzero count signal logic state but not the second nonzero count signal logic state; and the computational unit multiplies the input value by the result value each time the self timed clock signal having the first self timed clock signal logic state is received from the self timed control unit.

9. The computational array of claim 8 wherein the computational unit obtains a new input value when an exponent counter circuit produces the nonzero count signal having the second nonzero count signal logic state, indicating that the count value has been decremented to zero, and wherein the computational unit performs a new computation based on the new input value upon receiving the nonzero count signal from the exponent counter circuit.

10. The computational array of claim 1 wherein:

the self timed control unit receives an iteration signal and determines whether the new result value is to be calculated a number of times based on the iteration signal, providing the self timed clock signal having the first self timed clock signal logic state to the computational unit each time the self timed control unit determines that the new result value is to be calculated; and the computational unit calculates the new result value each time the self timed clock signal having the first self timed clock signal logic state is received from the self timed control unit, thus calculating the new result value a number of times based on the iteration signal.

11. The computational array of claim 1 wherein the computational unit receives a weight signal representing a weight value and multiplies the input value by the weight value.

12. The computational array of claim 1 wherein the computational unit comprises a multiplier.

13. The computational array of claim 1 wherein the computational unit comprises an adder.

14. A method of self timed calculation in a computational element in a computational array, comprising the steps of:

calculating a result value with a computational circuit based on an input value, and producing a completion signal upon completion of calculating the result value;

determining whether a new result value is to be calculated based on the completion signal and providing a self timed clock signal to the computational circuit, the self timed clock signal having a first self timed clock signal logic state when the new result value is to be calculated and a second self timed clock signal logic state when the new result value is not to be calculated; and calculating the new result value with the computational circuit upon the computational circuit receiving the self timed clock signal having the first self timed clock signal logic state.

15. The method of claim 14 wherein the step of calculating the new result value comprises calculating the new result value based on the input value and based on the result value previously calculated.

16. The method of claim 15 wherein:

the step of determining whether the new result value is to be calculated comprises:

obtaining an iteration signal and determining whether the new result value is to be calculated a number of times based on the iteration signal, and providing the self timed clock signal having the first self timed clock signal logic state to the computational circuit each time it is determined that the new result value is to be calculated; and the step of calculating the new result value comprises calculating the new result value each time the self timed clock signal having the first self timed clock signal logic state is received by the computational circuit, thus calculating the new result value a number of times based on the iteration signal.

17. The method of claim 16 wherein:

the step of determining whether the new result value is to be calculated comprises obtaining the iteration signal as an exponent signal indicating a power to which the input value is to be raised, and providing the self timed clock signal having the first self timed clock signal logic state to the computational circuit a number of times based on the power indicated by the exponent signal; and the step of calculating the new result value comprises multiplying the input value by the result value each time the self timed clock signal having the first self timed clock signal logic state is received by the computational circuit.

18. The method of claim 17 wherein the step of calculating the result value comprises obtaining a weight signal representing a weight value and initially multiplies the input value by the weight value instead of the result value.

19. The method of claim 18 wherein:

the step of determining whether a new result value is to be calculated comprises decrementing a count value initially set to the power indicated by the exponent signal each time the input value is to be multiplied by the result value, producing a nonzero count signal each time the count value is decremented, the nonzero count signal having a first nonzero count signal logic state when the count value remains above zero and a second nonzero count signal logic state when the count value no longer remains above zero, and providing the self timed clock signal having the first self timed clock signal logic state to the computational circuit if the nonzero count signal has the first nonzero count signal logic state but not the second nonzero count signal logic state; and the step of calculating the new result value comprises multiplying the input value by the result value each time the self timed clock signal having the first self timed clock signal logic state is received by the computational circuit.

20. The method of claim 19, further comprising the steps of:

obtaining a new input value when the nonzero count signal has the second nonzero count signal logic state, indicating that the count value has been decremented to zero; and performing a new computation with the computational circuit based on the new input value when the nonzero count signal has the second nonzero count signal logic state.

21. The method of claim 17 wherein the step of determining whether a new result value is to be calculated comprises:

decrementing a count value initially set to the power indicated by the exponent signal each time the input value is to be multiplied by the result value, producing a nonzero count signal each time the count value is decremented, the nonzero count signal having a first nonzero count signal logic state when the count value remains above zero and a second nonzero count signal logic state when the count value no longer remains above zero, and providing the self timed clock signal having the first self timed clock signal logic state to the computational circuit if the nonzero count signal has the first nonzero count signal logic state but not the second nonzero count signal logic state; and the step of calculating the new result value comprises multiplying the input value by the result value each time the self timed clock signal having the first self timed clock signal logic state is received by the computational circuit.

22. The method of claim 21, further comprising the steps of:

obtaining a new input value when the nonzero count signal has the second nonzero count signal logic state, indicating that the count value has been decremented to zero; and performing a new computation with the computational circuit based on the new input value when the nonzero count signal has the second nonzero count signal logic state.

23. The method of claim 14 wherein:

the step of determining whether the new result value is to be calculated comprises obtaining an iteration signal and determining whether the new result value is to be calculated a number of times based on the iteration signal, and providing the self timed clock signal having the first self timed clock signal logic state to the computational circuit each time it is determined that the new result value is to be calculated; and the step of calculating the new result value comprises calculating the new result value each time the self timed clock signal having the first self timed clock signal logic state is received by the computational circuit, thus calculating the new result value a number of times based on the iteration signal.

24. The method of claim 14 wherein the step of calculating the result value comprises obtaining a weight signal representing a weight value and multiplying the input value by the weight value.

* * * * *